United States Patent
Svobodnik

(10) Patent No.: US 7,248,007 B2
(45) Date of Patent: Jul. 24, 2007

(54) CONTROL SYSTEM TO MONITOR THE FUNCTIONING OF AN ELECTROMECHANICAL DRIVE IN A VEHICLE

(75) Inventor: Gregor Svobodnik, Wien Austria (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/276,630

(22) Filed: Mar. 8, 2006

(65) Prior Publication Data

US 2006/0202649 A1 Sep. 14, 2006

(30) Foreign Application Priority Data

Mar. 9, 2005 (DE) .................. 10 2005 010 899

(51) Int. Cl.
*H02P 7/06* (2006.01)
(52) U.S. Cl. .................. 318/254; 318/283; 318/286; 318/466; 388/816
(58) Field of Classification Search .............. 318/138, 318/245, 254, 466, 380–286, 603, 609, 139, 318/600; 388/816; 361/20–32
See application file for complete search history.

(56) References Cited

U.S. PATENT DOCUMENTS

| | | | | |
|---|---|---|---|---|
| 3,027,505 A | * | 3/1962 | Auld, Jr. .................. | 388/816 |
| 6,184,665 B1 | * | 2/2001 | Salina et al. .................. | 323/282 |
| 6,559,614 B2 | * | 5/2003 | Kock et al. .................. | 318/466 |
| 7,102,320 B1 | * | 9/2006 | Haman .................. | 318/800 |
| 7,112,899 B2 | * | 9/2006 | Schenk .................. | 307/113 |
| 2002/0024309 A1 | * | 2/2002 | Takagi .................. | 318/445 |
| 2003/0001534 A1 | * | 1/2003 | Kock et al. .................. | 318/466 |
| 2005/0132765 A1 | * | 6/2005 | Nagae et al. .................. | 70/252 |
| 2006/0294425 A1 | * | 12/2006 | Kollner et al. .................. | 714/30 |
| 2007/0029961 A1 | * | 2/2007 | Harita et al. .................. | 318/484 |

* cited by examiner

*Primary Examiner*—Paul Ip
(74) *Attorney, Agent, or Firm*—Baker Botts L.L.P.

(57) ABSTRACT

A control system for an electromechanical drive in a vehicle has a motor (29) whose connections (24, 25) are connected to the assigned control elements (2, 3) of a bridge circuit, a control circuit (21) with signal connections (12, 13) at which control signals are provided for controlling the control elements, a return circuit (6) through which information about the operating state of the motor (29) is returned to the control circuit (21) in order to monitor the functioning of the motor, wherein the signal connections (12, 13) can be switched as output or as input, the information about the operating state is returned through the return circuit (6) to these signal connections that can be switched as input or as output, and the control circuit has a monitoring program (21) that records and evaluates the returned information about the operating state during a monitoring phase in which the signal connections (12, 13) are switched as input.

20 Claims, 2 Drawing Sheets

US 7,248,007 B2

CONTROL SYSTEM TO MONITOR THE FUNCTIONING OF AN ELECTROMECHANICAL DRIVE IN A VEHICLE

PRIORITY

This application claims priority from German Patent Application No. DE 10 2005 010 899.7, which was filed on Mar. 9, 2005, and is incorporated herein by reference in its entirety.

TECHNICAL FIELD

The present invention relates to a control system for an electromechanical drive in a vehicle, comprising a motor whose connections are connected to assigned control elements of a bridge circuit, a control circuit that comprises signal connections on which control signals are provided for controlling the control elements and a return circuit through which information about the operating state of the motor is returned to the control circuit in order to monitor the functioning of the motor.

BACKGROUND

In automotive engineering electromechanical drive systems are used, for example in window regulators, in seat adjusters, in sunroof adjusters and for other accessory drive systems. They consist of an electric motor that is arranged in the cross-arm of a bridge circuit (also referred to as H-circuit). The armature current of the electric motor is specified using control elements of the bridge circuit. The control elements are controlled by control signals that provide a control circuit. The control elements are frequently formed using a relay for reasons of simplicity and costs. However, the bridge circuit can consist completely or partly of semiconductor switches. The control circuit usually contains a microprocessor or a microcontroller.

In a motor vehicle, an electromechanical drive is exposed to rough operating conditions. Pulse-shaped stress increases (load dump) can occur in the vehicle electrical system that can lead to a malfunction of the control. If the stress increase occurs during a control process of the relay, this can lead to a thermal overload of the mechanical contacts of the relay. If a normally open contact of a relay "hangs" on the positive counter contact, the motor could operate against a mechanical limitation and could be thermally overloaded. If there is no protective device and the error is unnoticed, this overheated motor can cause a fire. This poses a considerable safety hazard in a motor vehicle.

In order to prevent a thermal overload of the motor, the use, for example, of a temperature sensor to record the winding temperature of the motor, is known from prior art. A temperature sensor can fail and is also expensive. The other alternative is to use a monitoring circuit to monitor the operating state of the bridge circuit and thus the potential on the motor connecting terminals.

What poses to be a problem here is the expenditure that results from the fact that every returned state signal allocates an input signal connection to the control circuit. If the control circuit is designed, for example as a microcontroller, then the type, thus the overall size and also the price of the microcontroller are predetermined using the number of the returned signals. If the control circuit is supposed to be designed in a miniaturized form as a mechatronic module, it is disadvantageous to use a microcontroller having many I/O pins.

SUMMARY

The object of the present invention is to specify a control system for controlling and for monitoring the functioning of a motor in a bridge circuit in such a way that said control circuit can be designed in a simpler and more cost-effective manner.

This object can be achieved by a control system for an electromechanical drive in a vehicle, comprising a motor whose connections are connected to assigned control elements of a bridge circuit, a control circuit with signal connections to which control signals for controlling the control elements are fed, a return circuit through which information about the operating state of the motor is returned to the control circuit in order to monitor the functioning of the motor, wherein the signal connections can be switched as output or as input, the information about the operating state is returned through the return circuit to these signal connections that can be switched as input or as output, and a monitoring program is present in the control circuit that records and evaluates the returned operating state information during a monitoring phase in which the signal connections are switched as input.

The operating state information can be returned to a first signal connection and to a second signal connection. The return control circuit may consist of a first line path and a second line path, the electric potential on a first motor connection can be returned to the second signal connection and the electric potential on a second motor connection can be returned to the first signal connection of the control circuit. The return control circuit may consist of a first line path and a second line path, the electric potential on a first motor connection can be returned to the first signal connection and the electric potential on a second motor connection can be returned to the second signal connection of the control circuit. A voltage limitation can be configured in the first and the second line path using resistances. Each of the control elements can be designed as an electromagnetic control element. The elecromechanical control elements can be formed by normally open contacts of two relays, every normally open contact can be designed as a changeover switch and can be connected in each case to a motor connection. The two relays can be combined into one integrated relay module. Every relay may comprise relay coils each of which is connected to a relay driver circuit via a relay control line. The relay driver circuit can be an integrated control circuit of MOS technology. The relay driver circuit can be connected to the control circuit via a first control line and a second control line. The first line path can be connected to the second control line and the second line path to the first control line. The monitoring phase may take place in a period of time in which the output of the control signals is interrupted. The period of time of the monitoring phase can be shorter than the drop-out time of any of the electromechanical control elements.

According to the present invention, a control system is suggested in which a control circuit comprises signal connections that can be switched as input or as output. The control elements of the bridge circuit are controlled during a control phase. During the monitoring phase, the control circuit records the information about the operating state of the motor that is returned from the bridge circuit by a return circuit and evaluates this information. The same connections are used for the output of the control signals and for reading the operating state information. Thus a smaller number of signal connections is required for controlling and monitoring the signal connections. It is also possible to use a comparatively smaller and more cost-effective microcontroller. This proves to be a distinct advantage for mass-production.

A preferred embodiment of the present invention is characterized in that the operating state information is returned to a first and a second signal connection. Then a microcontroller as a control circuit requires only two PINs for controlling and monitoring the status information.

A return circuit having a crossed signal feedback is especially advantageous. This means, that a signal is tapped at the motor connection to one half bridge by the return circuit and is returned to the signal connection of the control circuit that is responsible for the control of the other half bridge. Thus, even if the microcontroller fails and a relay contact hangs at the same time, it is possible for the other relay contact to be made to switch by the signal feedback. If this switching operation is completed, both the normally open contacts of the relays lie on positive supply voltage. The potential difference between the motor connecting terminals is 0. The accessory drive system can be put into operation only if the error is rectified in a workshop. Thus this embodiment of the present invention is of special significance for applications in which high fire protection is required since the motor does not get overheated even in case of the malfunctioning of the microcontroller and simultaneous disturbance in the switching functions of a relay.

Assuming that a microcontroller having a low failure rate is used for the control circuit (that means, the double failure mentioned above is presumed to be improbable), a second embodiment of the present invention can be advantageous in which the signal feedback is not crossed. It has been observed that a "stuck" relay contact in motor vehicles—be it due to vibrations or by targeted controlling—can be released by itself. If the signal feedback is not crossed, it is possible to register this "self-healing effect." If the accessory drive system in the motor vehicle exclusively provides a convenience function, it can be advantageous to note this error only in an error register and without carrying out any further actions. The fault repair takes place later, e.g.: during a routine inspection of the vehicle.

In order to adjust the returned voltage level to the permissible input voltage of the control circuit, a voltage limitation is provided in every line path, said limitation being implemented using a resistance.

With respect to the manufacturing costs, it is advantageous if the control elements are formed by electromechanical switches of a changeover relay. Here, two relays are combined into one integrated relay module.

The changeover relay preferably comprises two relay coils that are connected to a relay driver circuit using relay control lines.

It is advantageous if the relay driver circuit is an integrated control circuit that is designed with MOS [Metal Oxide Semiconductor] technology.

It can also be advantageous if the monitoring phase can be carried out almost during the operation of the motor. For this purpose the control of the relay contacts is interrupted for a brief period of time and the measuring process is carried out. Subsequently, the control process is continued. The period of interruption is selected to be so short that the contacts of the relay do not drop out.

BRIEF DESCRIPTION OF THE DRAWINGS

With a view to explain the present invention in more detail, the following part of the description includes reference to the drawing, which contains further design forms, details and embodiments of the present invention. The following is illustrated.

DETAILED DESCRIPTION

Figure 1:
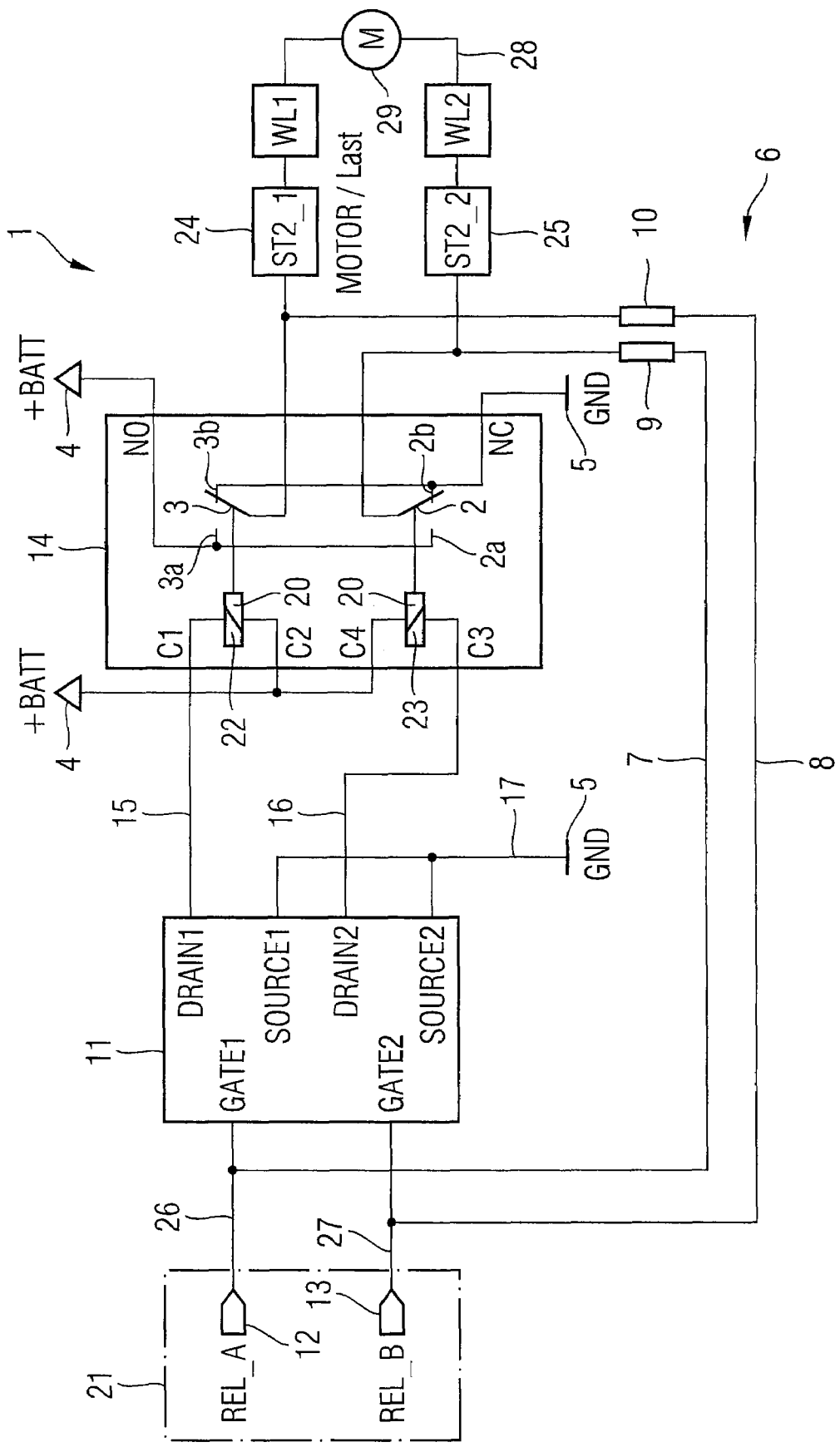
FIG. 1 illustrates a circuit diagram of a first embodiment in which the signal feedback is crossed.
Figure 2:
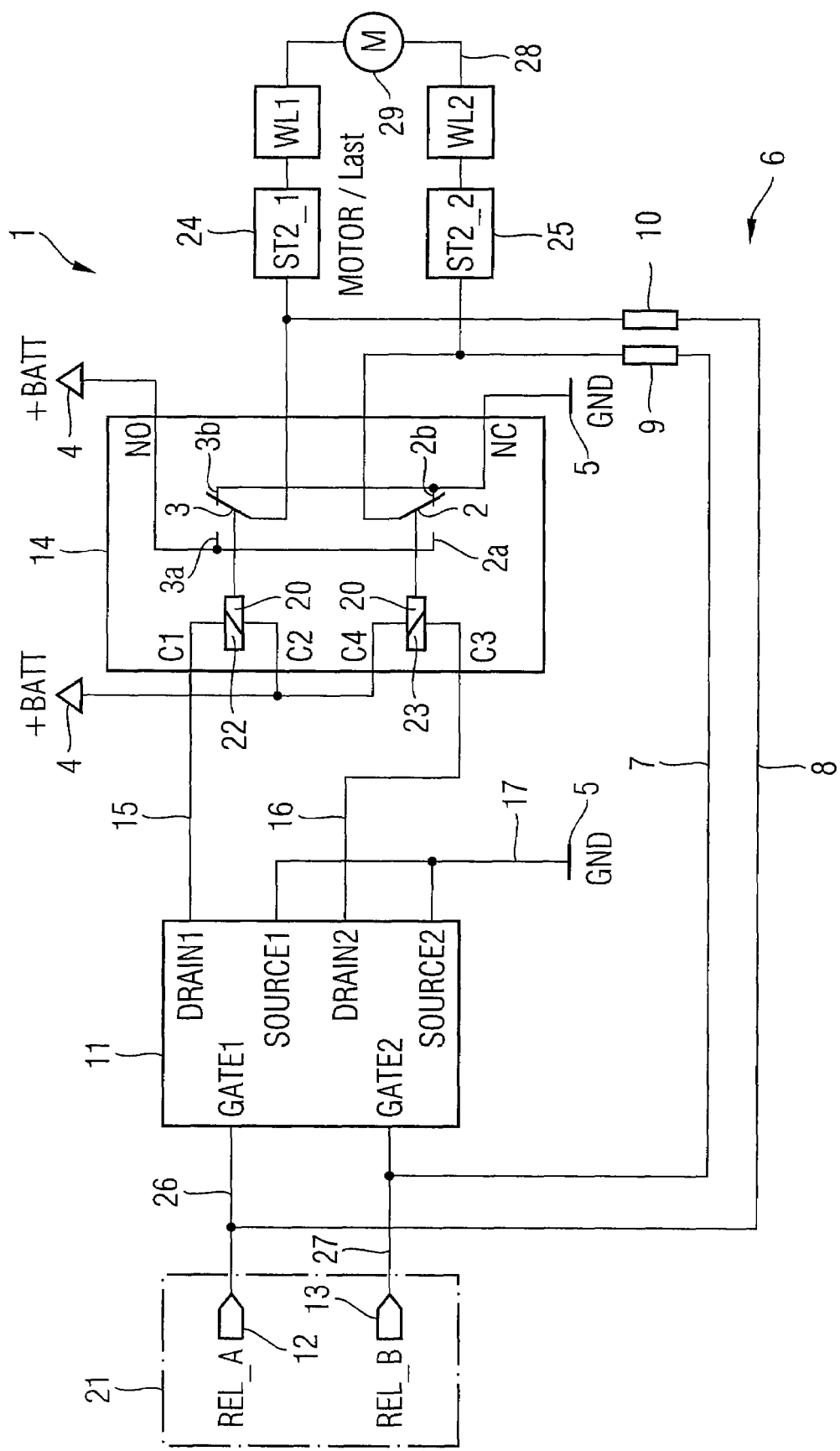
FIG. 2 illustrates a circuit diagram of the second embodiment in which the signal feedback is not crossed.

FIG. 1 and FIG. 2 each illustrate a circuit diagram of a preferred embodiment of the control system 1 according to the present invention. The control circuit illustrated is typical for an accessory drive system in a motor vehicle. The control system 1 consists of a control circuit 21 whose signal connections 12 and 13 are provided with control signals. The electricity in an electric motor 29 is controlled using these control signals. The electric motor 29 is connected using a first and a second motor connecting line 18, 19 in the cross-arm 28 of a bridge circuit (H-circuit). The control elements of the bridge circuit are formed in a relay module 14 by relays 22 and 23. The relay module 14 contains a first relay 22 with a first normally open contact 3 and a second relay 23 with a second normally open contact 2. The control lines 15 and 16 connect each of the relay coils 20 on the input-side of the relays 22 and 23 to an output of a relay driver circuit 11. In the embodiment illustrated, this relay driver circuit 11 is designed with the MOS technology. It is controlled using a first control line 26 and a second control line 27 by the control circuit 21. The control circuit 21 is a microcontroller in the embodiment illustrated. The microcontroller 21 contains the control program for the drive system and the monitoring program in a read-only memory. The changeover contacts 2 and 3 are each located in a half bridge and are assigned to a motor connection 24 and/or 25. The connections 24, 25 of the electric motor 29 can be connected to a positive pole 4 and/or a negative pole 5 of a direct current voltage supply using the changeover contacts 2 and 3.

The following is the mode of operation when controlling the motor:

In order to actuate the motor 29, the signal connections 12 and 13 are switched as output. These output signal connections can be changed over between the logical states of "1" and "0." In the presence of a logical "1" at the signal connection 12 and a logical "0" at the signal connection 13, the first normally open contact 3 lies on its counter-contact 3a and the second normally open contact 2 lies on its counter contact 2b. A reversal of the motor current and thus a change in the direction of rotation takes place if a logical "0" is present at the output signal connection 12 and if a logical "1" is present at the output signal connection 13.

The changeover contacts 2 and 3 assume the position illustrated in FIG. 1 if the microcontroller 21 switches the signal connections 12 and 13 (REL_A and REL_B) as output and emits "0" on them. Inversely, each of the two normally open contacts 2, 3 lies on its counter contact 2a and 3a respectively if a logical "1" is output in each case on the output signal connections 12 and 13. In both cases, the motor 29 is at zero current.

In order to monitor the operating state of the motor 29 and/or the bridge circuit, a feedback of the operating state information is provided. According to the present invention, this takes place by a feedback circuit 6. Using the feedback circuit 6, the electric potential present on the terminals 24, 25 is returned to the signal connections 12, 13. As opposed to the previous part of the description, the signal connections 12, 13 are not switched as output, but as input during this monitoring phase. The voltage signal measured on the terminals 24 and 25 using the return lines 7 and 8 can be recorded and evaluated on these PINs 12 and 13 that are switched as high impedance input signal connections.

In order to prevent the returned voltage signal from exceeding the permissible input voltage on the input signal connections 12, 13, resistances 9 and 10 are provided in the return lines 7 and 8 for voltage limitation.

Since the signal connections 12, 13 are used both as output signal connections and also as input signal connections, additional input signal connections for the monitoring can be completely left out. It is thus possible to use a cost-effective type of a microcontroller that has a comparatively small overall size.

Reference is made to the circuit diagram of FIG. 1 for describing the first embodiment having crossed signal feedback.

As can be easily seen in FIG. 1, the return circuit 6 is implemented in such a way that the electric potentials on the motor connections 24 and 25 can be returned in a crossed manner. This means that the first return line 8 returns the electric potential on the first motor connecting terminal 24 to the second signal connection 13 of the control circuit 21. In contrast, the second return line 7 returns the electric potential on the second motor connection 25 to the first signal connection 12 of the control circuit 21. In order to monitor the functioning of the motor, the microcontroller 21 switches the signal connection 12 from output to input. The signal tapped by the normally open contact 2 and/or the motor terminal 25 using the return line 7 is returned to the signal connection 12 after a level adjustment. The microcontroller records this signal and evaluates it. If a "hanging" state or "stuck" state of a relay contact is detected, the microcontroller 21 resets the signal connection to output and emits a logical "1."

If the microcontroller fails in the case of a double error, then PIN 12 and PIN 13 exist in a high impedance state. However, the first relay coil 22 is current-carrying due to the crossed signal feedback (second return line 7), so that the first normally open contact 3 changes over electrodynamically to the counter contact 3a. Thus both the motor connections 24 and 25 are on the positive supply voltage and the motor comes to a standstill. A thermal overheating of the motor is ruled out in this switch state.

Reference is made to FIG. 2 for describing the second embodiment in which the signal feedback is not crossed.

The circuit illustrated in FIG. 2 differs from the one illustrated in FIG. 1 solely in that the first return line 8 in FIG. 2 is connected to the first control line 26 and the second return line 7 is connected to the second control line 27. In order to control the motor, it is assumed that the control signal "0" is output on PIN 12 and the control signal "1" is output on PIN 13. In order to stop the motor, both the output signal connections 12 and 13 are placed at logical "0." In order to monitor the relay contacts, PIN 13 is switched to input and the potential existing on the normally open contact 2 and/or the motor terminal 25 is read and evaluated.

If an error is detected by the microcontroller 21, then it is possible to carry out different actions. These actions can depend on, e.g. the type of accessory drive system used in the motor vehicle.

If the accessory drive system controls, for example a convenience function, then the action simply involves storing the error in an error memory and not taking any further actions. This error memory is read out by a diagnostic device in a workshop at a later point of time and the defective drive is replaced.

However, if it is a safety-critical accessory drive system, then the evaluation involves sending a signal to the driver that he must immediately contact a workshop.

As described above, the function monitoring is preferably carried out when the motor is not controlled. However, this is not an absolute requirement. It is also possible to carry out the function monitoring almost during the control phases. For this purpose, the output of the control signals is interrupted for a short period of time and the signal connections 12 and 13 are switched from output to input. During this measuring phase, the status information is read and a logically defined control signal is output subsequently on PIN 12 and PIN 13. If the interruption of the control signals is sufficiently short, i.e. shorter than the drop-out time of any of the relays 22, 23, then the current flow in the motor 29 is retained. In this manner, monitoring is also possible during a control process.

Naturally, it is also possible to use thoughtfully designed control logic or an ASIC [Application Specific Integrated Circuit] instead of a microcontroller. It is also feasible to implement the functions of the monitoring program using hardware components consistently with the requirements of the circuit.

List of the Reference Symbols Used
1 Circuit arrangement for controlling a motor
2 Second normally open contact
2a, 2b Counter-contacts of the second normally open contact
3 First normally open contact
3a, 3b Counter-contacts of the first normally open contact
4 Power supply
5 Ground
6 Return circuit
7 Second line path, return line
8 First line path, return line
9 Resistance in the second line path
10 Resistance in the first line path
11 Relay-driver circuit
12 First signal connection (input/output signal connection)
13 Second signal connection (input/output signal connection)
14 Relay module
15 Control line for the first relay
16 Control line for the second relay
17 Connecting line between source and ground
18 First motor connecting line
19 Second motor connecting line
20 Relay coil
21 Control circuit, microcontroller
22 First relay
23 Second relay
24 First motor connection
25 Second motor connection
26 First control line between 12 and 11
27 Second control line between 13 and 11
28 Cross-arm
29 Motor

What is claimed is:
1. A control system for an electro-mechanical drive in a vehicle, comprising:
 a motor whose connections are connected to assigned control elements of a bridge circuit,
 a control circuit with signal connections to which control signals for controlling the control elements are fed, a return circuit through which information about the operating state of the motor is returned to the control circuit in order to monitor the functioning of the motor, wherein the signal connections can be switched as output or as input, the information about the operating state is returned through the return circuit to these signal connections that can be switched as input or as output, and a monitoring program is present in the control circuit that records and evaluates the returned operating state information during a monitoring phase in which the signal connections are switched as input.

2. A control system according to claim 1, wherein the operating state information is returned to a first signal connection and to a second signal connection.

3. A control system according to claim 2, wherein the return control circuit consists of a first line path and a second line path, the electric potential on a first motor connection is returned to the second signal connection and the electric potential on a second motor connection is returned to the first signal connection of the control circuit.

4. A control system according to claim 2, wherein the return control circuit consists of a first line path and a second line path, the electric potential on a first motor connection is returned to the first signal connection and the electric potential on a second motor connection is returned to the second signal connection of the control circuit.

5. A control system according to claim 3, wherein a voltage limitation is configured in the first and the second line path using resistances.

6. A control system according to claim 1, wherein each of the control elements is designed as an electromagnetic control element.

7. A control system according to claim 6, wherein the elecromechanical control elements are formed by normally open contacts of two relays, every normally open contact is designed as a changeover switch and is connected in each case to a motor connection.

8. A control system according to claim 7, wherein the two relays are combined into one integrated relay module.

9. A control system according to claim 8, wherein every relay comprises relay coils each of which is connected to a relay driver circuit via a relay control line.

10. A control system according to claim 9, wherein the relay driver circuit is an integrated control circuit of MOS technology.

11. A control system according to claim 9, wherein the relay driver circuit is connected to the control circuit via a first control line and a second control line.

12. A control system according to claim 11, wherein the first line path is connected to the second control line and the second line path to the first control line.

13. A control system according to claim 6, wherein the monitoring phase takes place in a period of time in which the output of the control signals is interrupted.

14. A control system according to claim 6, wherein the period of time of the monitoring phase is shorter than the drop-out time of any of the electromechanical control elements.

15. A control system for an electro-mechanical drive in a vehicle, comprising:

a motor coupled with assigned control elements of a bridge circuit, a control circuit comprising signal terminals to which control signals for controlling the control elements are fed, a return circuit operable to return information about the operating state of the motor to the control circuit in order to monitor the functioning of the motor, wherein the signal terminals can be switched as output or as input, the information about the operating state is returned through the return circuit to these signal terminals that can be switched as input or as output, and wherein the control circuit is operable through a monitoring program that records and evaluates the returned operating state information during a monitoring phase in which the signal connections are switched as input.

16. A control system according to claim 15, wherein the operating state information is returned to a first signal connection and to a second signal connection.

17. A control system according to claim 16, wherein the return control circuit consists of a first line path and a second line path, the electric potential on a first motor connection is returned to the second signal connection and the electric potential on a second motor connection is returned to the first signal connection of the control circuit.

18. A control system according to claim 16, wherein the return control circuit consists of a first line path and a second line path, the electric potential on a first motor connection is returned to the first signal connection and the electric potential on a second motor connection is returned to the second signal connection of the control circuit.

19. A control system according to claim 17, wherein a voltage limitation is configured in the first and the second line path using resistances.

20. A control system according to claim 15, wherein each of the control elements is designed as an electromagnetic control element.

* * * * *